Sept. 24, 1963　　　W. T. EPPLER　　　3,104,472
DIAMETER GAGES
Filed Nov. 23, 1960　　　2 Sheets-Sheet 2
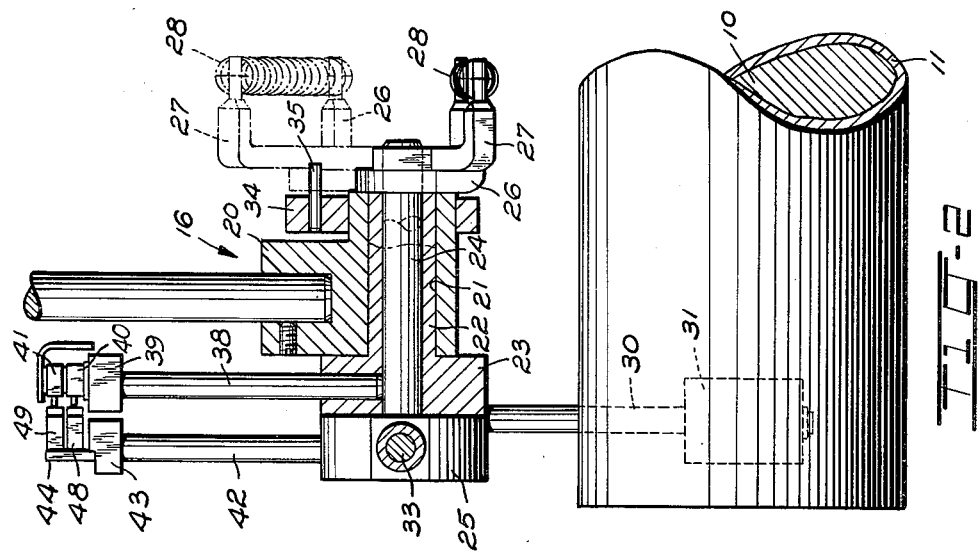
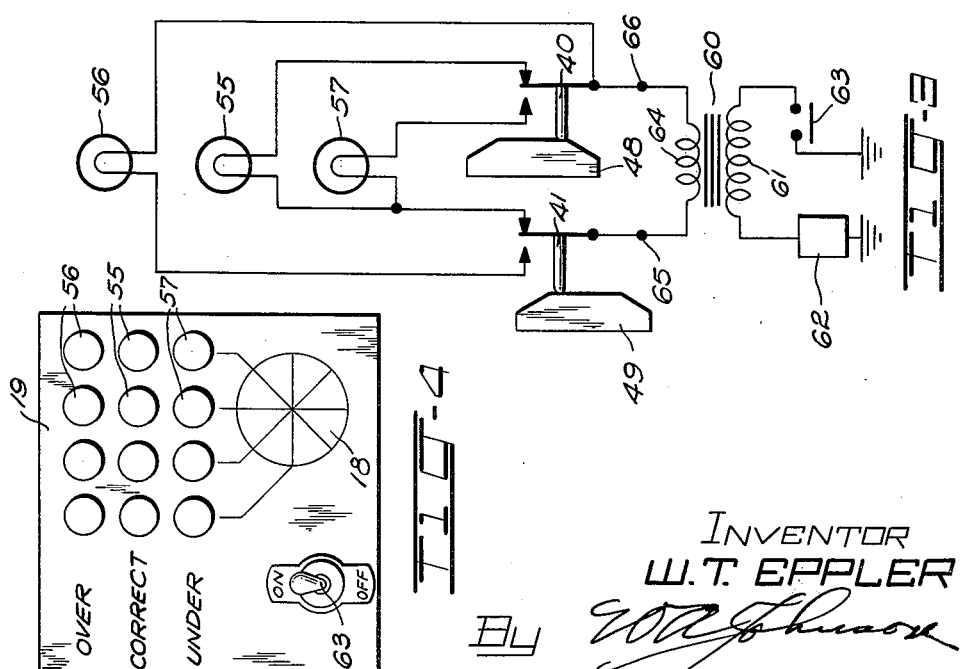
INVENTOR
W. T. EPPLER
BY
ATTORNEY

United States Patent Office 3,104,472
Patented Sept. 24, 1963

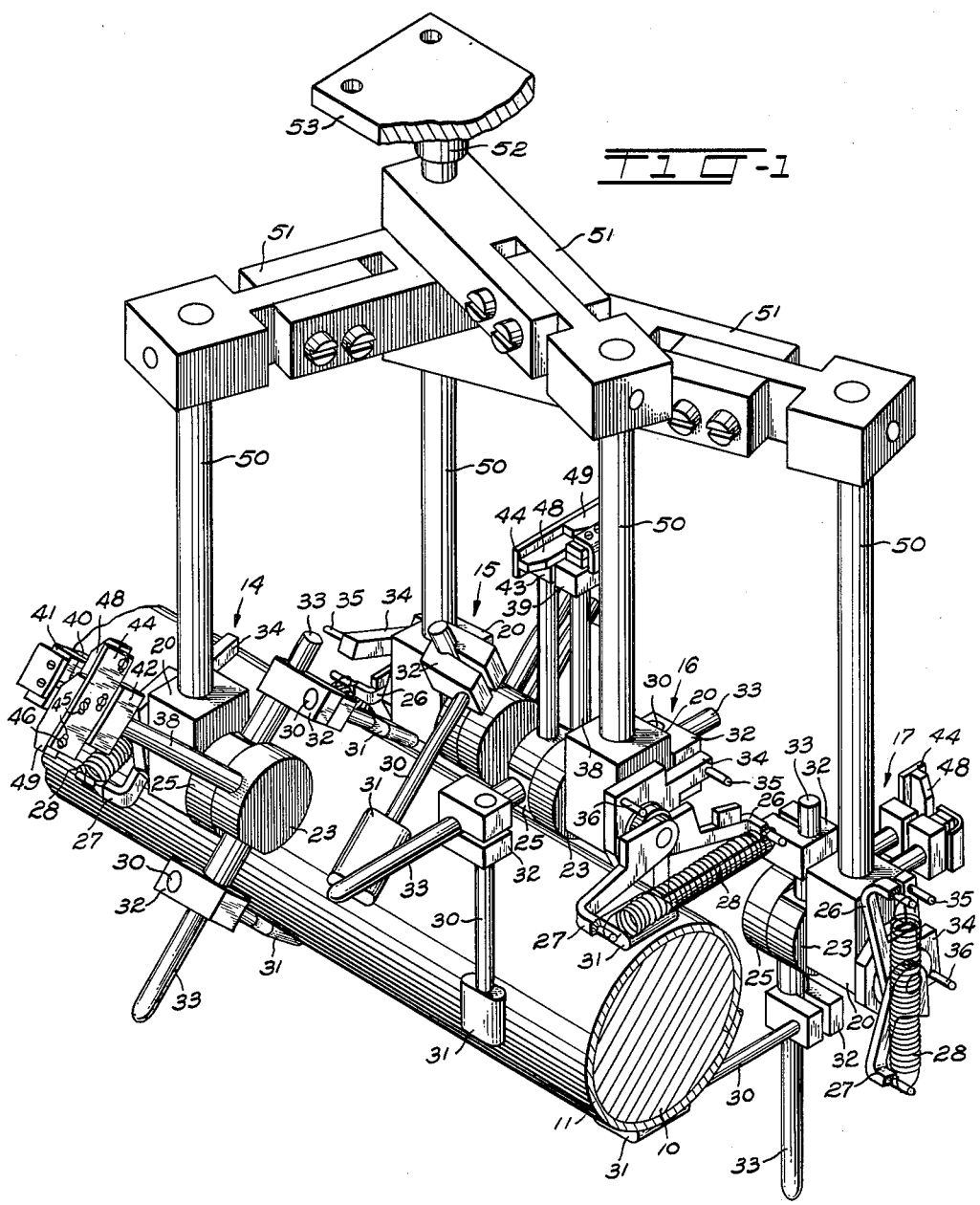

3,104,472
DIAMETER GAGES
Walter T. Eppler, Cranford, N.J., assignor to Western Electric Company, Incorporated, New York, N.Y., a corporation of New York
Filed Nov. 23, 1960, Ser. No. 71,253
3 Claims. (Cl. 33—178)

This invention relates to diameter gages, particularly apparatus for gaging the diameters of elongated articles, circular in cross section.

In the manufacture of certain types of telephone cables, a plastic sheath is applied over a metal sheath covering a cable core. It is important in applying the plastic sheath by an extrusion method that the metal sheath be as round as is practical so that the concentricity of the plastic sheath to the metal sheath can be controlled. To accomplish this, rolls for rounding the metal sheath cable are provided ahead of the extrusion operation. A diameter gage is necessary to check the out-of-roundness of the metal sheathed core so that the operator will know what roll adjustments to make to improve the roundness of the core.

The object of the invention is a simple, efficient, and highly practical apparatus for gaging the diameters of elongated articles, circular in cross section, while the articles are advancing longitudinally.

According to the object, the invention comprises a gaging unit having feelers mounted on rockable elements and responsive to variations in diameters of an elongated article, circular in cross section, to operate indicating means signifying the relationship of the diameters being gaged to a predetermined standard.

More specifically, there may be, for example, four gaging units positioned with respect to the article being gaged so that independent gaging operations may be performed on different diameters to indicate what adjustments need be made on pressure rollers to bring about, in the present instance, concentricity of a metal sheath with regard to a center line of a cable.

Other objects and advantages will be apparent from the following detailed description when considered in conjunction with the accompanying drawings wherein:

FIG. 1 is an isometric view of the apparatus gaging an elongated article;

FIG. 2 is a vertical sectional view of a portion of one of the gaging units;

FIG. 3 is a schematic illustration of portions of one of the gaging units and the circuits therefor; and FIG. 4 is a front elevational view of a panel with the indicating lamps of all the gaging units.

In the present instance, the elongated article, circular in cross section, which is being gaged, is a cable 10 having a metal sheath 11 thereon. The area of the cable during its advancement from a machine which forms the sheath 11 on the cable and an extruder which is to extrude a plastic cover over the metal sheath, includes a length of the article or cable which is unsupported, except at the sheathing machine and the extruder, where the cable may vary in its position from a fixed center line extending from the exit of the sheathing machine to the entrance of the extruder. These movements may vary as much as an inch from the center and with these conditions existing, the gaging means must allow for such movements while maintaining accuracy in gaging operations.

In the present instance, the apparatus includes four gaging units 14, 15, 16, and 17 which are identical in structure in every detail with the exception of the positions in which they are supported about the article being gaged, they being arranged in these different positions to gage the horizontal diameter, the vertical diameter, and the intermediate 45° angle diameters, as illustrated by a diagram 18 on a panel 19 in FIG. 4. Therefore, a description of the unit 16 for gaging the horizontal diameter will apply to all of the units.

The unit 16, FIGS. 1 and 2, has a fixed position holder 20 with an aperture 21 therein to receive a hollow shaft-like portion 22 of a rockable element 23 and a solid shaft-like portion 24 of a rockable element 25. With this construction, the rockable elements 23 and 25 move about a common axis. An L-shaped member 26 is fixed to the right end of the hollow shaft-like portion 22 and an L-shaped member 27 is fixed to the right end of the solid shaft-like portion 24. When in gaging positions, shown in solid lines in FIG. 2, the members 26 and 27 are drawn toward each other by a connecting spring 28 to move feelers 30 with their engaging pads 31 into close engagement with diametrically opposed portions of the sheathed cable. The feelers 30 have their upper ends supported by adjustable blocks 32 which are mounted on rods 33, the inner ends of which are secured to their respective rockable elements 23 and 25. In other words, the rockable elements have rods extending in opposite directions therefrom so that the blocks 32 may be adjusted along the rods to locate the inner surfaces of the pads 31 of the feelers 30 known distances apart which are equivalent to correct diameters or diameters of desired lengths for the sheathed cable.

The spring 28 contributes its force to hold the pads of the feelers against the opposing sides of the cable regardless of variation in movement of the cable from its predetermined center. A bracket 34 has pins 35 and 36 projecting therefrom, as shown in FIG. 1, to be engaged by the L-shaped members 26 and 27 when it is desirable to move the feelers of the unit out of gaging positions for threading of the cable from the sheathing machine to the extruder. This may be accomplished by moving either feeler to move its rockable element about the axis of the unit until its respective L-shaped member moves the spring beyond the axis of the unit where the spring will cause location of the L-shaped members in the broken line position shown in FIG. 2.

The rockable element 23 has an arm 38 fixed thereto and extending upwardly to a position where an enlarged portion 39 supports switches 40 and 41. Another arm 42 has its lower end mounted in the rockable element 25 while its upper end 43 carries a mounting plate 44 (see unit 14 FIG. 1) provided with elongate apertures 45 for mounting screws 46. There are two pairs of mounting screws disposed in two pairs of spaced elongate apertures for the mounting of cams 48 and 49 in positions which are highly adjustable with respect to their switches 40 and 41.

The description thus far relates to the like structures of all of the units 14 to 17, inclusive. The fixed position holders 20 of the units are mounted on the lower ends of rods 50, the upper ends of the rods for units 14, 16, and 17 being secured to adjustable supporting arms 51 which are supported by, and may be moved about, the rod 50 for the unit 15. This rod is supported at 52 by a bracket 53 fixed at a suitable position above the path of the cable. The rods 50 and the supporting arms 51 may be arranged to support the units 14 to 17, inclusive, in their respective positions to gage their respective diameters of the article or cable.

Each unit has a series of indicating means such as lamps 55, 56, and 57 which have their respective colors of green, red, and yellow. The green lamps represent the correct diameter within predetermined limits, whereas the red lamp 56 indicates the diameter beyond said limits and the yellow lamp 57 indicates the diameter under said limits. The gaging apparatus has a transformer 60 with a primary winding 61 disposed in a circuit to a source of electrical energy 62 and under the control of a switch 63. A secondary winding 64 of the transformer supplies electrical energy to connections 65 and 66 from which circuits, identical with those shown in FIG. 3, are provided for each of the four units. With the cams 48 and 49 adjusted to positions illustrated in FIG. 3 when the diameter of the unit 16 is correct, the relative positions of the cams 48 and 49, with respect to the projections or the cam engaging portions of the switches 40 and 41, will be substantially as illustrated in FIG. 3 allowing movement of the cams in either direction, in this instance up or down, the distances allowed by the aforementioned predetermined limits.

*Operation*

The units 14 to 17, inclusive, are moved into their open positions during threading of the cable from the sheathing machine to the extruder after which the units are moved into their gaging positions as illustrated in FIG. 1. Assuming that all of the units, particularly the relative positions of their feelers 30, through the adjustment of their blocks 32 on the arms 33 have been made, conditioning the apparatus for gaging a cable with diameters of given lengths, the apparatus requires very little time in being moved into gaging position once the cable has been threaded and the extrusion and sheathing operations are ready to perform their respective functions. During the continuous longitudinal movement of the article or cable, even with lateral variations in its movement, the gaging units will follow or permit such movements without varying the gaging results. The apparatus is set according to the illustration in FIG. 3 so that, if all four diameters are correct, all of the green lights will be on. However, should there be a condition where any one of the diameters should be over the correct size, the feelers will rock their elements 23 and 25 to rock the arms 38 and 42 to move the cams 48 and 49 relative to their switches 40 and 41. In this present illustration of an oversized condition, the cams 48 and 49, viewed in FIG. 3, will move downwardly while the switches 40 and 41 will move upwardly, causing switch 40 to remain in its present positon but allowing the switch 41 to move from its inner contact to its outer contact, thereby opening the circuit to the green lamp 55 and closing the circuit to the red lamp 56.

If the opposite condition should occur, that is, if a portion of the cable should have a diameter under or shorter than the correct diameter, wherein the feelers will move toward each other rather than away from each other, the reverse action will take place in the illustration in FIG. 3. The cams 48 and 49 will move upwardly in this illustration while the switches jointly move downwardly causing the switch 41 to remain against its inner contact, while the cam 48 allows the switch 40 to move from its outer contact to its inner contact, again breaking the circuit to the green lamp 55 but, in this instance, closing the circuit to the yellow lamp 57.

Through this arrangement, the operator need only observe the panel, illustrated in FIG. 4. If all of the diameters are correct or within the predetermined limits, determined by the positions of the cams 48 and 49 relative to each other, and of course to their respective switches 40 and 41, the green lights 55 in the center of each group will be illuminated. However, if there should be a variation in the cable at any of the four diameters being gaged, which substantially cover the circumference of the cable to the extent that a variation anywhere in the cable would cause some variation in certain of the gaging units, this condition would be registered on the panel through the extinguishing of any of the green lights and the illumination of either its respective red or yellow light. This, with the aid of the diagram 18 on the panel, tells the operator immediately that there should be an adjustment in a predetermined set of pressure rolls to correct this condition.

Frequently there may be illumination of a yellow lamp representing a diameter which may be perpendicular to an indication of a red lamp. In this instance, the pressure rolls representing the diameter indicated by the red lamp would be moved toward each other to bring that particular diameter within the correct dimensions and, at the same time, resulting in the squeezing of the cable to change the under dimensions of the diameter perpendicular thereto to be corrected.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for gaging diameters of elongated articles circular in cross section while each article is advanced longitudinally comprising a gaging unit having a fixed position holder spaced from the article, a pair of rockable elements carried by the holder, feelers mounted on the elements and positioned respectively to engage diametrically opposed surfaces representing a diameter of the moving article being gaged, force applying means adapted to rock the elements to cause the feelers to closely engage their opposing surfaces, an arm mounted on and extending outwardly from each element so that outer ends thereof will be disposed at predetermined normally spaced positions when the diameter being gaged remains constantly at a given length to cause the feelers to remain at predetermined spaced positions, switches mounted on one of the arms and adapted to control three circuits, three lamps of different colors disposed individually in their respective ones of the three circuits to be energized respectively when the diameter being gaged is of the given length, greater than the given length and less than the given length, separate cams for operating the switches, and means mounted on the other arm to support the cams for adjustment relative to each other and their switches so that the feelers may be moved predetermined limits within and beyond the ends of said given length prior to causing the cams to change positions of the switches.

2. An apparatus for gaging diameters according to claim 1 in which a plurality of the gaging units are disposed at spaced positions longitudinally of the advancing article, separate supports for the holders of the units to locate the units at different positions about the article to gage different diameters of the article, and means to support the lamps of the units in adjacent rows.

3. An apparatus for gaging diameters according to claim 2 in which indicating means representing the different diameters being gaged are disposed adjacent the lamps and directed to their respective rows of lamps so that any of the diameters which vary from the given length may be identified.

References Cited in the file of this patent
UNITED STATES PATENTS

| | | |
|---|---|---|
| 2,531,317 | Baney et al. | Nov. 21, 1950 |
| 2,721,317 | O'Neill | Oct. 18, 1955 |
| 2,783,460 | Pistoles | Feb. 26, 1957 |